US008240197B2

(12) United States Patent
Lawrence et al.

(10) Patent No.: US 8,240,197 B2
(45) Date of Patent: Aug. 14, 2012

(54) VEHICLE BRAKE TESTING ASSEMBLY

(75) Inventors: Jon D. Lawrence, Grand Rapids, MI (US); Timothy J. Leep, Zeeland, MI (US); James R. Lehman, Potterville, MI (US); Bryan K. VandenBosch, Sparta, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 423 days.

(21) Appl. No.: 12/555,514

(22) Filed: Sep. 8, 2009

(65) Prior Publication Data
US 2010/0058851 A1 Mar. 11, 2010

Related U.S. Application Data

(60) Provisional application No. 61/095,188, filed on Sep. 8, 2008.

(51) Int. Cl.
*G01M 17/007* (2006.01)

(52) U.S. Cl. ........................................ 73/123; 73/116.06

(58) Field of Classification Search ............... 73/116.06, 73/116.07, 116.08, 121, 122, 123, 124, 125, 73/126
See application file for complete search history.

(56) References Cited

U.S. PATENT DOCUMENTS

| 3,490,276 A | 1/1970 | Maxwell et al. |
| 3,527,090 A | 9/1970 | Imada |
| 3,581,560 A | 6/1971 | Odier |
| 4,848,142 A | 7/1989 | Fujimori et al. |
| 4,912,970 A | 4/1990 | Gicewicz |
| 5,000,038 A | 3/1991 | Katt |
| 5,063,773 A | 11/1991 | Fujimori et al. |
| 5,269,179 A | 12/1993 | Vattakattu et al. |
| 5,277,060 A | 1/1994 | Lehman et al. |
| 5,311,770 A | 5/1994 | D'Angelo |
| 5,337,600 A * | 8/1994 | Kaneko et al. ............. 73/116.07 |
| 5,375,461 A | 12/1994 | Suzuki |
| 5,450,748 A | 9/1995 | Evans et al. |
| 5,452,605 A | 9/1995 | Wilson et al. |
| 5,561,242 A * | 10/1996 | Naumann et al. ............ 73/65.09 |
| 5,656,764 A | 8/1997 | Loeffler |

(Continued)

FOREIGN PATENT DOCUMENTS

CN 2418066 Y 11/1999

(Continued)

OTHER PUBLICATIONS

Burke E. Porter publication depicting products available more than one year prior to Sep. 8, 2008, including a single roll (upper left) and cradle roll (upper right) brake test machines.

(Continued)

*Primary Examiner* — Eric S McCall
(74) *Attorney, Agent, or Firm* — Gardner, Linn, Burkhart & Flory, LLP

(57) ABSTRACT

A compact, modular and versatile vehicle testing assembly for testing at least the brakes of an assembled vehicle comprises a pair of rollers adapted to support a tire of a tire and wheel assembly of a vehicle positioned on the testing assembly, with the pair of rollers being moveable relative to one another to alter the spacing there between. A drive system is connected to one of the rollers to operate as a drive roller for selectively imparting rotational motion to a tire of a vehicle tire and wheel assembly, with the other roller comprising a freewheeling roller to which rotational motion is imparted by a vehicle tire. A brake member is engageable with the freewheeling roller to selectively inhibit rotation of the freewheeling roller.

17 Claims, 5 Drawing Sheets

U.S. PATENT DOCUMENTS

| | | | |
|---|---|---|---|
| 6,050,137 | A | 4/2000 | Merrill, Sr. |
| 6,070,332 | A | 6/2000 | Kane |
| 6,360,591 | B1 | 3/2002 | Carley |
| 6,561,013 | B1 | 5/2003 | Leep |
| 6,860,145 | B2 | 3/2005 | Bergst et al. |
| 6,898,965 | B2 | 5/2005 | Zuilhof et al. |
| 7,054,727 | B2 | 5/2006 | Kemp et al. |
| 7,058,488 | B2 | 6/2006 | Kemp et al. |
| 7,181,971 | B1 * | 2/2007 | Sauer et al. ............ 73/670 |
| 7,265,821 | B1 | 9/2007 | Lawrence et al. |
| 7,406,862 | B2 | 8/2008 | Madonna |
| 2004/0200272 | A1 | 10/2004 | Bergst et al. |
| 2008/0011072 | A1 | 1/2008 | Bergeron |
| 2008/0022761 | A1 | 1/2008 | Seibl |
| 2008/0087104 | A1 * | 4/2008 | Matsumoto ............ 73/862.55 |

FOREIGN PATENT DOCUMENTS

| | | |
|---|---|---|
| CN | 1309287 A | 2/2001 |
| DE | 3101422 A1 | 8/1982 |
| DE | 3233960 C1 | 2/1984 |
| DE | 3841248 A1 | 6/1990 |
| EP | 1126266 A2 | 8/2001 |
| WO | 95/06866 A1 | 3/1995 |
| WO | 95/35489 A1 | 12/1995 |

OTHER PUBLICATIONS

Burke E. Porter product proposal for a Model 3600 Roll Brake Test Machine for FORD St. Louis, Apr. 28, 1994.

Burke E. Porter "Covering the World: End of Line Test Systems" product brochure, 2005.

Burke E. Porter "Covering the World: Chassis Dynamometer Products" product brochure, 2002.

Written Opinion of the International Searching Authority for International Application No. PCT/US2009/056219.

Office Action issued by the State Intellectual Property Office of the People's Republic of China dated Dec. 23, 2011.

* cited by examiner

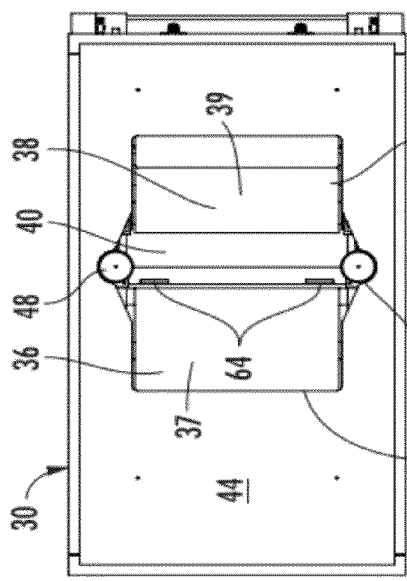
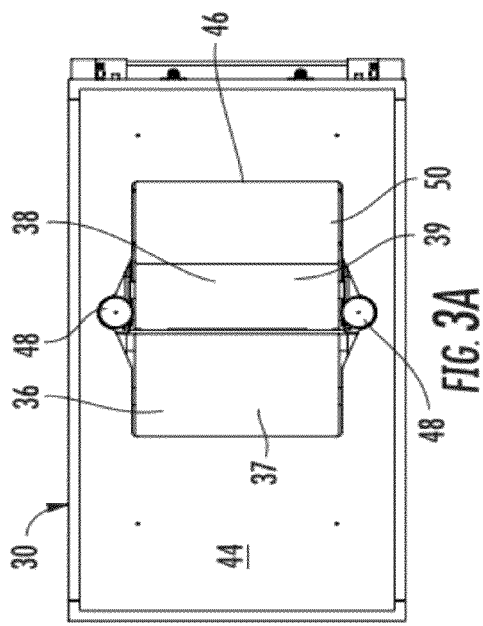
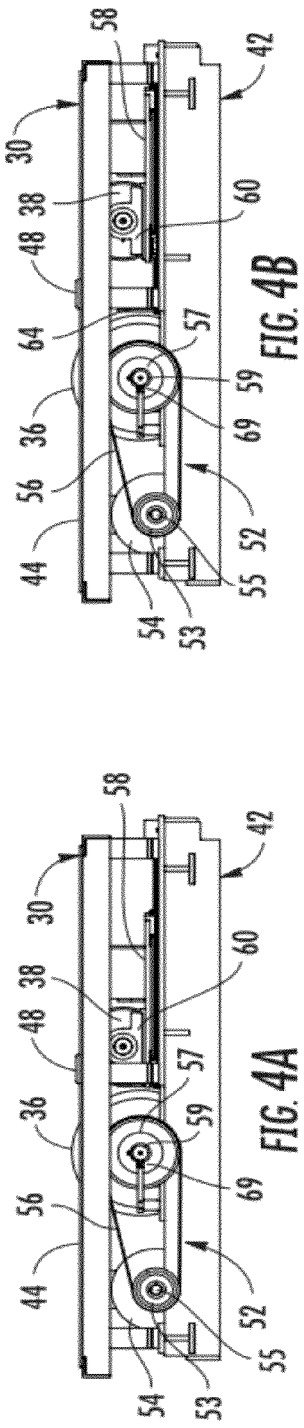

VEHICLE BRAKE TESTING ASSEMBLY

CROSS REFERENCE TO RELATED APPLICATION

The present application claims the benefit of U.S. patent application Ser. No. 61/095,188, filed Sep. 8, 2008, which is hereby incorporated herein by reference in its entirety.

BACKGROUND OF THE INVENTION

The present invention is directed to a vehicle testing apparatus, and in particular to a roll/brake testing apparatus for testing of brakes and/or drive train components of an assembled vehicle.

Vehicle roll/brake testing machines are widely used throughout the automotive industry to verify the operation of various vehicle systems after the vehicle has been assembled. Known roll/brake testing machines include apparatuses having a single large roller and/or a pair of cradle rollers, with the vehicle tires being positioned on the rollers during testing. The roller or rollers of a testing machine may be rotated by the power train of the vehicle during acceleration of the vehicle wheels to a desired speed prior to application of the braking system. Alternatively, testing machine rollers driven by a separate drive unit may be used to impart rotational motion to a vehicle wheel, such as to a non-driven vehicle wheel. Braking force data over time is monitored during braking for verification of the vehicle braking system to confirm the operation and performance of the vehicle's braking system and/or drive train, with the braking force being derived based on the inertia of the testing machine roller or rollers and any other linked rotational inertia components.

SUMMARY OF THE INVENTION

The present invention provides a roll/brake vehicle testing apparatus for testing the brake system and/or drive train components of an assembled vehicle.

According to an aspect of the present invention, a vehicle testing assembly for testing at least the brakes of an assembled vehicle comprises a pair of rollers adapted to support a tire of a tire and wheel assembly of a vehicle positioned on the testing assembly. The pair of rollers comprise a first roller and a second roller with the first and second rollers being moveable relative to one another to alter the spacing between the rollers. A drive system is connected to the first roller whereby the first roller comprises a drive roller for selectively imparting rotational motion to a tire of a vehicle tire and wheel assembly, with the second roller comprising a freewheeling roller to which rotational motion is imparted by a vehicle tire. The testing assembly further includes a brake member engageable with at least one of the first and/or second rollers to selectively inhibit rotation of the engaged rollers.

Embodiments of the vehicle testing assembly may include multiple pairs of similarly constructed roller pairs with a vehicle that is to be tested being positioned with the tires of the tire and wheel assemblies at the roller pairs. The various pairs of rollers may be constructed as separate cradle modules that may be joined together by frame members, and may be adjustable for accommodation of differing wheelbases. In particular embodiments the position of the second roller is moveable relative to the first roller of a given roller pair to alter the spacing without movement of the first roller. A linear actuator may be operatively connected to at least one of the rollers with the rollers being selectively moved relative to one another by extension and retraction of the linear actuator. The rollers may be moveable toward one another into a closed position in which the first and second rollers are in substantial proximity for aiding the entry and exit of a vehicle to and from the testing assembly with the brake member engaging the first roller and/or second roller when the rollers are in the closed position.

The brake member may be substantially stationary with the second roller being moved into engagement with the brake member to inhibit rotation of the first and second rollers when the rollers are in the closed position, with the brake member inhibiting rotation of the rollers via friction engagement with outer surfaces of the rollers. In such an embodiment the brake member may comprise a compliant brake member positioned between the first and second rollers with the brake member being sandwiched into contact with the first and second rollers in the closed position. In still further embodiments, the drive system includes an electric motor having a rotational axis that is approximately horizontally coplanar with the rotational axis of the first roller to substantially minimize the overall height of the vehicle testing assembly.

According to another aspect of the present invention, a vehicle testing assembly for testing at least the brakes of an assembled vehicle comprises a pair of cradle modules adapted to support axially aligned tires of tire and wheel assemblies of both sides of a vehicle positioned on the testing assembly. Each such cradle module comprising a first roller and a second roller that are moveable relative to one another to alter the spacing there between and a drive system connected to the first roller to selectively impart rotational motion to the tire of the supported vehicle tire and wheel assembly whereby the first roller comprises a drive roller with the second roller comprising a freewheeling roller. The drive roller and freewheeling roller being moveable toward one another into a closed position in which the rollers are in substantial proximity for aiding the entry and exit of a vehicle to and from the testing assembly. The testing assembly may include an additional pair of cradle modules for supporting an additional set of axially aligned tires of tire and wheel assemblies of both sides of a vehicle positioned on the testing assembly.

In particular embodiments each cradle module includes a linear actuator operatively connected to the freewheeling roller to selectively move the freewheeling roller relative to the respective drive roller without movement of the drive roller. In still further embodiments, the drive system of each cradle module includes an electric motor having a rotational axis that is approximately horizontally coplanar with the rotational axis of the first roller to substantially minimize the overall height of the vehicle testing assembly. Each cradle module may include a brake member engageable with the respective freewheeling roller and/or drive roller to selectively inhibit rotation of the engaged rollers. The brake members may engage the freewheeling rollers when the freewheeling rollers are moved into the closed positions, and may be positioned between the rollers with the brake members being sandwiched into contact with the rollers in the closed position to inhibit rotation of the freewheeling rollers and drive rollers via friction engagement with outer surfaces of the rollers.

According to another aspect of the present invention, a vehicle testing assembly for testing at least the brakes of an assembled vehicle comprises a plurality of cradle modules that are each adapted to support a separate tire of a tire and wheel assembly of a vehicle positioned on the testing assembly. Each such cradle module comprising a first roller and a second roller, a linear actuator operatively connected to at least one of the first and second rollers, and a drive system connected to the first roller and selectively imparting rotational motion to the tire of a vehicle tire and wheel assembly whereby the first roller comprises a drive roller. The first and second rollers being laterally moveable relative to one another to alter the spacing there between and being selectively moved by extension and retraction of the linear actuator. The drive system including an electric motor having a rotational axis that is approximately horizontally coplanar of with the rotational axis of the drive roller to substantially minimize the overall height of the vehicle testing assembly. The cradle modules may be joined together by frame members.

In particular embodiments, the second roller of each cradle module comprises a freewheeling roller with the linear actuator being operatively connected to the freewheeling roller such that it is moveably adjustable relative to the drive roller to adjust the spacing between the rollers without movement of the drive roller. The freewheeling rollers of each cradle module being moveable toward the respective drive rollers into a closed position in which the drive and freewheeling rollers are in substantial proximity for aiding entry and exit of a vehicle to and from the testing assembly, and each cradle module may include a brake member engageable with the freewheeling roller and/or drive roller to selectively inhibit rotation of the engaged rollers when in the closed position.

In any embodiment, the vehicle testing assembly may include a test controller system adapted to enable determinations of force applied by a tire of a vehicle tire and wheel assembly, such as may be applied during braking to a drive roller of a cradle module in accordance with the present invention. Such a test controller system including an encoder for monitoring the rotational speed of the drive roller during deceleration and calculating the brake force via the known inertia of at least the drive wheel.

The roll/brake vehicle testing assembly of the present invention provides a low-cost, versatile, and convenient modular assembly for testing vehicle brake systems and drive train components. Cradle modules for receiving a tire of a vehicle tire and wheel assembly include a pair of rollers for supporting the tire, with the pair of rollers being moveable relative to each other to alter the circumferential supporting spacing of the tire on the pair of rollers. The pairs of rollers may comprise a non-powered roller moveable relative to a fixed drive roller driven by a drive system, with a brake member being used to prevent rotation of the non-powered roller and/or powered roller when the non-powered roller is moved into a closed position relative to the drive roller. The ability of the rollers to move relative to each other aids in the testing of vehicle models having different tire diameters and ground clearances. The ability of the rollers to be positioned in the closed position whereby the non-powered roller and powered roller are constrained from rotating enables test vehicles to be easily driven onto and off from the testing assembly. The frame of the testing assembly includes left and right sub-frames to which the cradle modules are mounted. The frame is of a low profile height and modular for enabling easy installation and removal.

These and other objects, advantages, purposes and features of this invention will become apparent upon review of the following specification in conjunction with the drawings.

BRIEF DESCRIPTION OF THE DRAWINGS

FIG. 3A is a top plan view of the cradle module of FIG. 2A;

FIG. 3B is a top plan view of the cradle module of FIG. 2B;

FIG. 4A is a side elevation view of the cradle module of FIG. 2A;

FIG. 4B is a side elevation view of the cradle module of FIG. 2B;

DESCRIPTION OF THE PREFERRED EMBODIMENTS

Figure 1:
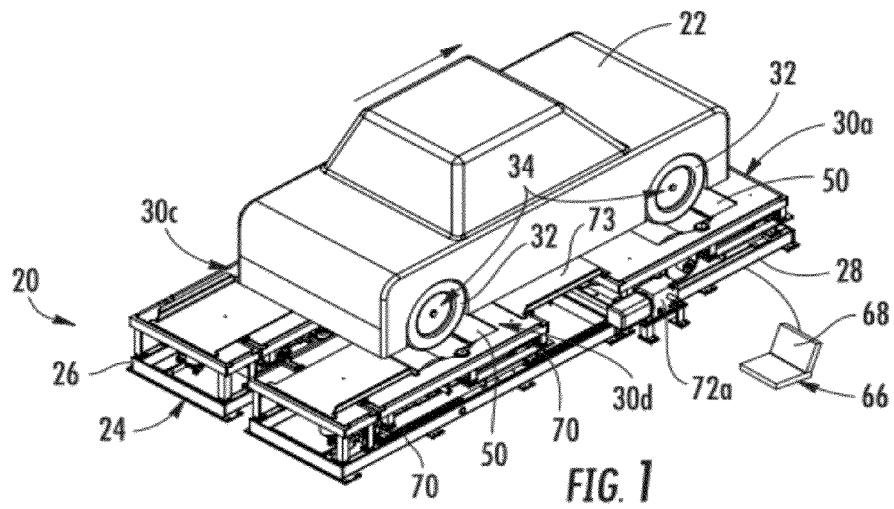
FIG. 1 is a perspective view of a roll/brake vehicle testing assembly in accordance with the present invention.

The present invention will now be described with reference to the accompanying figures, wherein the numbered elements in the following written description correspond to like-numbered elements in the figures. Roll/brake vehicle testing assembly 20 of FIG. 1 is used to test the braking system and/or drive train components of assembled vehicle 22. In the illustrated embodiment testing assembly 20 includes a frame 24 having a left sub-frame 26 and a right sub-frame 28 with four cradle modules 30a, 30b, 30c, 30d positioned about frame 24 to enable the tires 32 of the tire and wheel assemblies 34 of vehicle 22 to be positioned at and supported by cradle modules 30. As understood from FIGS. 2A and 2B, and described below, each cradle module 30 includes a pair of rollers formed by a first roller 36 having an outer tire engaging surface 37 and a second roller 38 having an outer tire engaging surface 39. Second roller 38 is moveable relative to first roller 36 to selectively adjust the spacing there between, and when second roller is separated a gap 40 is formed between first and second rollers 36, 38. The selective positioning of second roller 38 relative to first roller 36 enables testing assembly 20 to accommodate testing different models of vehicles with different tire diameter sizes and, when first and second rollers 36, 38 are positioned together, aids in driving vehicle 22 onto and off from cradle modules 30. The compact and modular construction and ability to interconnect cradle modules 30 provides for a vehicle testing assembly that is readily transported, assembled and useable in developing manufacturing markets.

In the illustrated embodiment of testing assembly 20 each cradle module 30 is of like construction. Cradle module 30 includes a cradle frame 42 to which is mounted a support or drive surface 44 with an opening 46 through which first and second rollers 36, 38 extend. Also extending through opening are a pair of guides 48 located on the sides of opening 46 to aid in maintaining a vehicle wheel 32 on cradle module 30 between first and second rollers 36, 38. A cover plate 50 is slideable beneath drive surface 44 and moves in concert with second roller 38 to aid in the driving of a vehicle 22 onto and off from testing assembly 20.

Referring now to FIGS. 2A-6B, cradle module 30 includes a drive system 52 coupled to first roller 36, with drive system 52 comprising an electric motor 54 and a drive belt 56 coupled to first roller 36. Drive system 52 is used to impart rotational motion to first roller 36 such that first roller 36 is a driven roller that in turn imparts rotational motion to a tire and wheel assembly 34 to thereby operate as a drive roller for operation of testing assembly 20. In the illustrated embodiment, second roller 38 is not powered and is mounted to a second roller sub-frame 58 via roller bearings 60 located on either end of second roller 38 that enable second roller 38 to rotate freely such that it operates as a freewheeling roller.

Figure 6A:
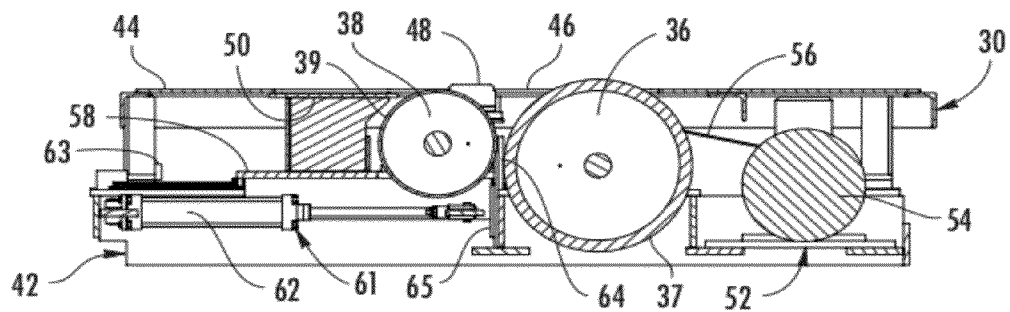
FIG. 6A is a side sectional elevation view along the line VI-VI of FIG. 5 with the cradle module rollers shown in a closed orientation.
Figure 6B:
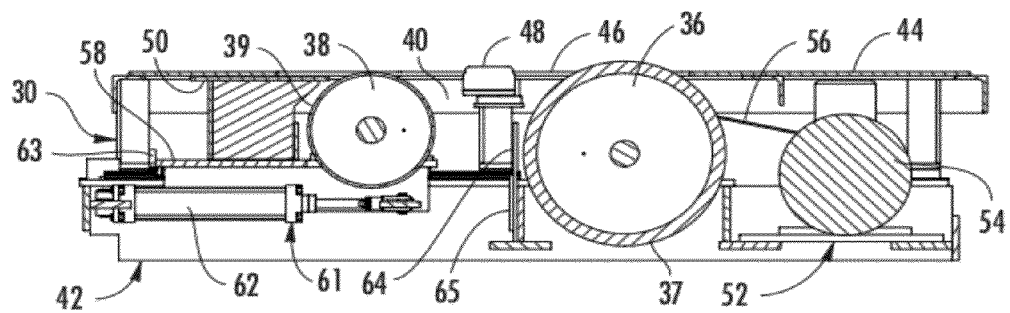
FIG. 6B is a side sectional elevation view of the cradle of FIG. 5 taken along the line VI-VI with the cradle module rollers shown in an open orientation.

As understood with reference to FIGS. 4A and 4B, electric motor 54 includes a drive pulley 53 mounted to motor shaft 55 with belt 56 disposed about a driven pulley 57 mounted to roller shaft 59 of first roller 36. Electric motor 54 is disposed generally laterally of first roller 36 such that the rotational axis of electric motor 54 is approximately horizontally coplanar with the rotational axis of first roller 36. This arrangement of electric motor 54 relative to first roller 36 advantageously aids in minimizing the overall height of cradle module 30, which in turn aids in the transportation and use of testing assembly 20. The minimized height of testing assembly 20 provides for the use of shorter length ramps (not shown) when driving a vehicle 22 onto and off from assembly 20, and in installations in which assembly 20 is disposed within a pit, shallower pits may be employed. In the illustrated embodiment the rotational axis of electric motor 54 is slightly lower than the rotational axis of first roller 36 relative to a vertical plane. Due to the larger diameter of first roller 36 relative to electric motor 54 some amount of variation between the relative locations of the rotational axes of electric motor 54 and first roller 36 will not affect the overall height of testing assembly 20 as electric motor 54 either will not be or will only be slightly vertically disposed outside of the profile of first roller 36. Accordingly, FIGS. 6A and 6B illustrate that the lowest portion of the outer circumference of first roller 36 is vertically lower than electric motor 54.

As noted, second roller 38 is laterally moveable relative to first roller 36 along the longitudinal axis of testing assembly 20, with movement being provided by a drive system 61. As understood from FIGS. 2A, 2B, 6A and 6B, drive system 61 may comprise one or more linear actuators used to move first roller 36 relative to second roller 38, with the linear actuators shown in the illustrated embodiment as comprising a pair of pneumatic cylinders 62 affixed at one end to cradle frame 42 (FIGS. 2A and 2B) and at an opposite end to moveable second roller sub-frame 58 to impart sliding movement to second roller 38 relative to first roller 36. Alternatively, linear actuators may comprise a single pneumatic cylinder, or one or more hydraulic cylinders or ball screws, or first roller 36 may be moveable relative to a stationary second roller 38, or both first roller 36 and second roller 38 may be moveable.

Figure 2A:
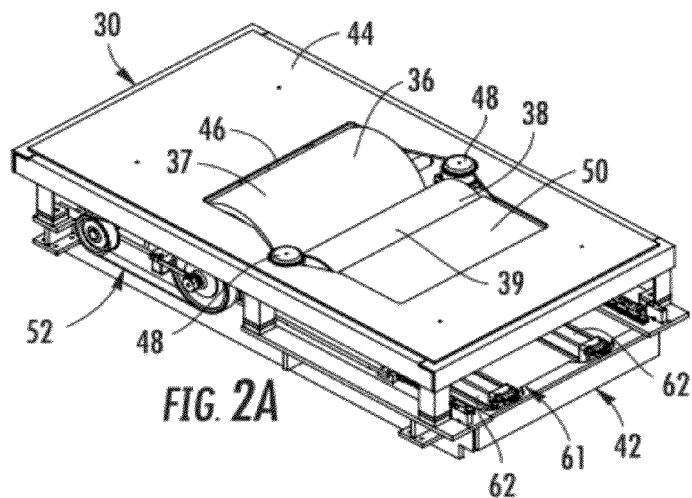
FIG. 2A is a perspective view of cradle module in accordance with the present invention removed from the vehicle testing assembly of FIG. 1, with the cradle module rollers shown in a closed orientation.
Figure 2B:
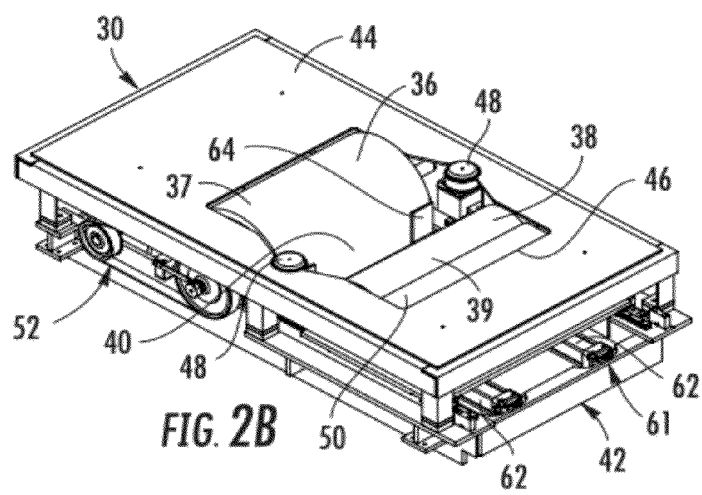
FIG. 2B is a perspective view of the cradle module of FIG. 2A with the cradle module rollers shown in an open orientation.
Figure 5:
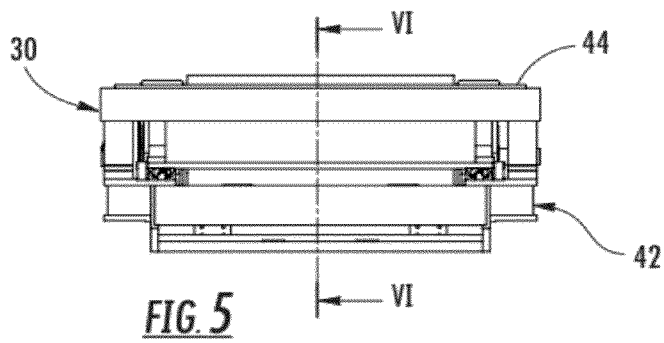
FIG. 5 is an end elevation view of a cradle module in accordance with the present invention.

Second roller 38 may be moved between two positions, such as that shown in FIGS. 2A and 2B to define a closed position (FIG. 2A) and an open position (FIG. 2B). Stops 63 and 65 (FIGS. 6A and 6B) located on cradle frame 42 may be used to set either the closed position and/or the open position whereby ball screws 62 extend and retract until contact is made with either of stops 63 or 65 to establish the open and/or closed positions. In such an embodiment stop 63 used to establish the open position may be adjustable, selectable or itself moveable in order to aid in the testing of vehicles having larger or smaller tire diameters. Still further, the closed position may be obtained simply by extending pneumatic cylinders 62 until second roller 38 contacts first roller 36 in the manner described below. Alternatively, a position sensor may be provided for monitoring the position of second roller with the desired position being programmable and selectable based on the vehicle model to be tested.

A brake member 64 is positioned between first and second rollers 36, 38, with brake member 64 in the illustrated embodiment comprising a compliant urethane member. When first roller 36 is not being driven by drive system 52, second roller 38 may be moved toward first roller 36 into the closed position of FIG. 2A such that brake member 64 contacts and is sandwiched between first and second rollers 36, 38 (FIG. 6A). The engagement of brake member 64 with first and second rollers 36, 38 inhibits, restrains or prevents rotation of the rollers due to the friction contact imparted therebetween. As described below, this aids in the driving of vehicle 22 onto and off from testing assembly 20 as first and second rollers 36, 38 may or would otherwise tend or be able to spin against the rotation of a tire 32 when vehicle 22 is driven onto or off from test assembly 20, in turn complicating the proper positioning and retention of a tire 32 on first and second rollers. In the illustrated embodiment, brake member 64 thus particularly aids in inhibiting rotation of first roller 36 when vehicle 22 is driven onto the cradle modules 30 and aids in inhibiting rotation of second roller 38 when vehicle 22 is driven off from cradle modules 30. Brake member 64 may be made of alternative brake pad materials and/or one or more brake members may be employed. Still further a mechanical locking device may be employed to prevent a first and/or a second roller from rotating with such a brake member either being itself moved into engagement with one or both of the rollers or with one or both of the rollers being brought into engagement with a stationary brake.

Figure 7A:
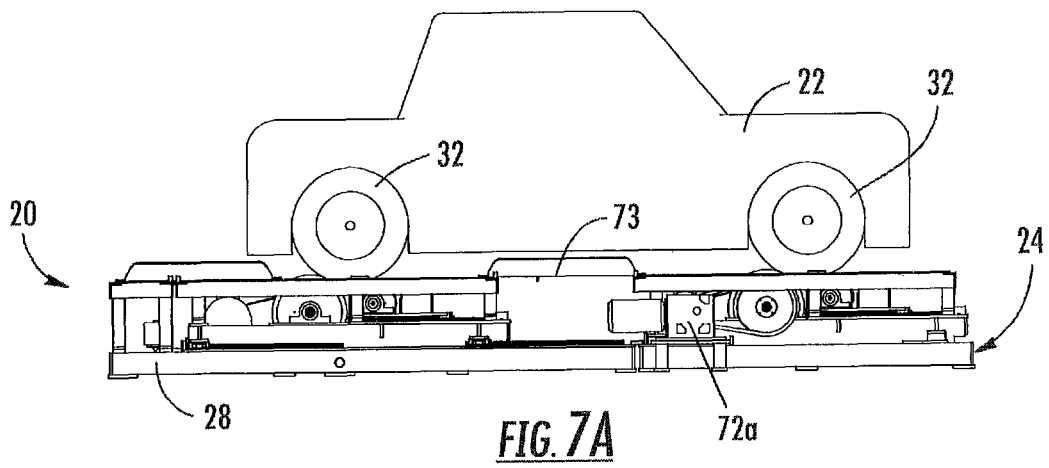
FIG. 7A is a side elevation view of the vehicle testing assembly of FIG. 1 shown with the rollers of the cradle modules in a closed orientation.
Figure 7B:
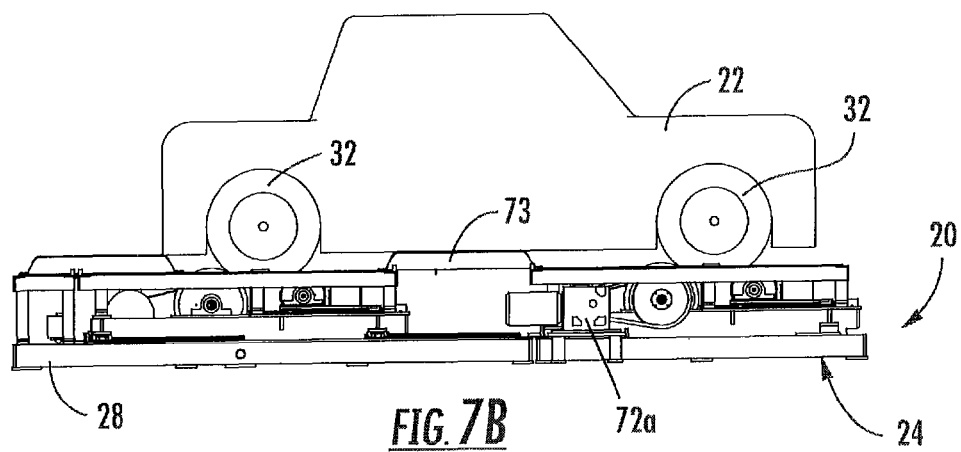
FIG. 7B is a side elevation view of the vehicle testing assembly of FIG. 1 shown with the cradle module rollers in an open orientation.

As understood from FIGS. 6A and 6B, first roller 36 has a larger diameter than second roller 38, with the upper most circumferential surface of first roller 36 extending vertically above the upper most circumferential surface of second roller 36. Relative to the forward driving direction of vehicle 22, as understood from FIGS. 7A and 7B, first rollers 36 of cradles 30 are positioned behind tires 32 and second rollers 38 are positioned in front of tires 32. The relative higher position of first rollers 36 permits higher braking forces.

A test controller system 66 is included that comprises or includes a computer 68 coupled to a rotational or roller speed or rotation sensor, such as an encoder 69 (FIGS. 4A and 4B), positioned at the shaft 59 of first roller 36 of each cradle module 30. Test controller system 66 is able to calculate braking forces and other forces associated with drive train components of vehicle 22 by monitoring the rotational speed of first roller 36 over time, which provides a deceleration value. Based on the known inertia values of the first and second rollers 36, 38 and the drive system 52 and the determined deceleration value, forces such as braking force may be conventionally computed. Alternative test controller systems may be employed that do not monitor or measure rotational speed, such as a torque arm system employing a force transducer or lever arm measuring motor torque or a current based system monitoring electrical current.

Figure 8:
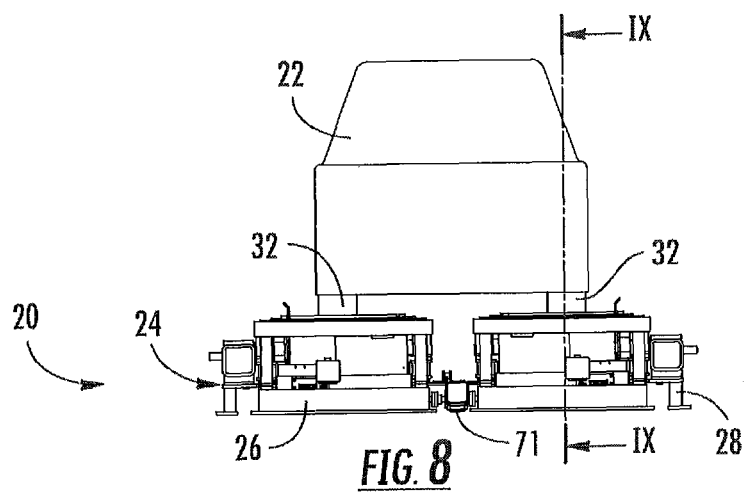
FIG. 8 is an end elevation view of the vehicle testing assembly of FIG. 1.
Figure 9A:
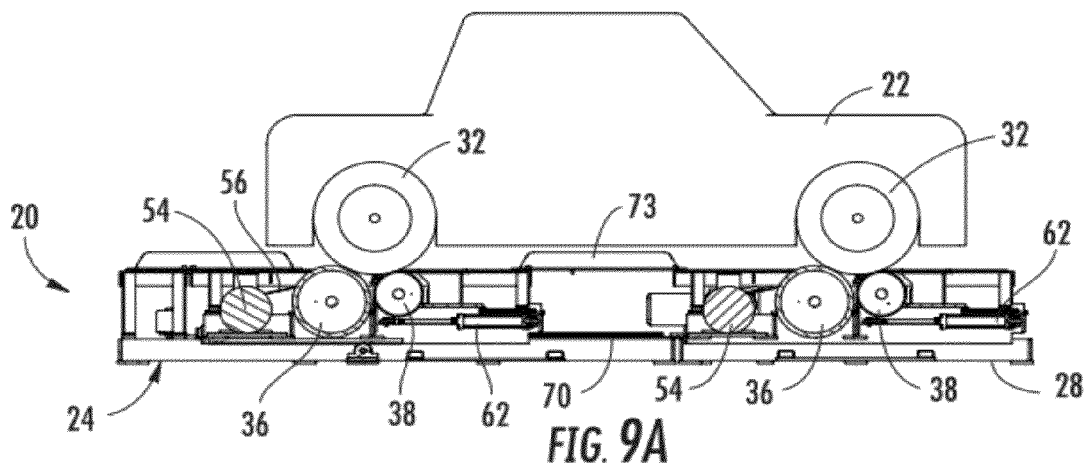
FIG. 9A is a side sectional view of the vehicle testing assembly taken along the line IX-IX of FIG. 8 shown with the cradle module rollers in a closed orientation.
Figure 9B:
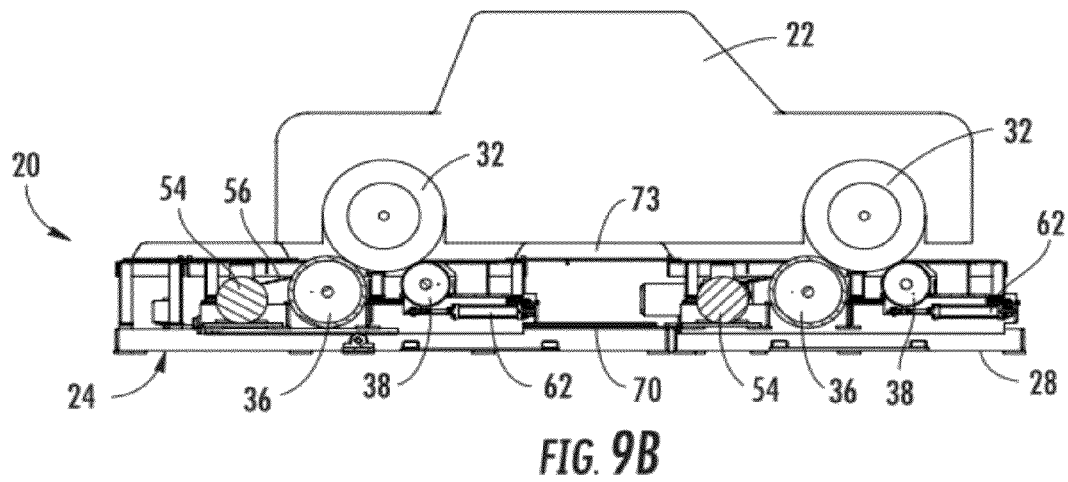
FIG. 9B is a side sectional elevation view of the vehicle testing assembly of FIG. 8 taken along the line IX-IX with the cradle module rollers shown in an open orientation.
Figure 10:
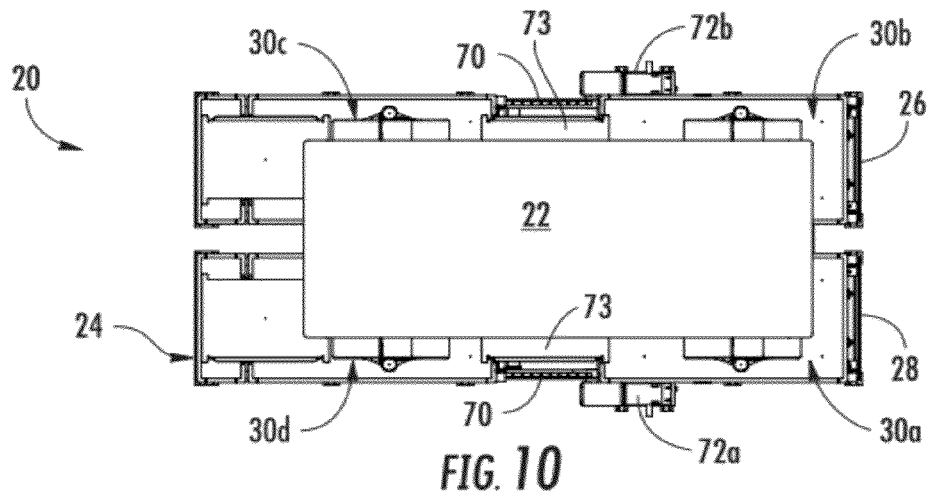
FIG. 10 is a top elevation view of the vehicle testing assembly of FIG. 1.

Referring now to FIGS. 1 and 10, relative to the forward travel direction of vehicle 22, the two rearward cradle modules 30c and 30d are selectively positionable along frame rails 70 to enable vehicle testing assembly 20 to accommodate vehicles having differing wheelbase lengths, with a frame rail 70 being located on each side to join cradle modules 30a and 30d together and cradle modules 30b and 30c together. In the embodiment illustrated, the rearward cradle modules 30c and 30d may be manually positioned and locked in position. Alternatively, a powered system, such as a rack and pinion or chain drive system may be employed to move the cradle modules. Still further, in such an alternative system the positions may be programmable and selectable based on vehicle model. A frame connector 71 (FIG. 8) joins the left sub-frame 26 and right sub-frame 28 together, with each sub-frame comprising a fore and aft cradle module 30 connected together by a frame rail 70. The fore and aft cradle modules 30 of both the left and right sub-frames 26, 28 are spanned by ramps 73 to enable vehicle 22 to drive along and over the support surfaces 44 of cradle modules 30.

FIGS. 1 and 10 also illustrate the inclusion of gear boxes 72a and 72b associated with cradle modules 30a and 30b, respectively. Gear boxes 72a and 72b include a clutch engaging mechanism to selectively provide additional torque or inertia to cradle modules 30a and 30b, respectively, when gear boxes 72a and 72b are engaged with the cradle modules 30a and 30b for alternative testing requiring greater force. FIGS. 1 and 10 illustrate the inclusion of gear boxes 72a and 72b to operate with the front wheels of vehicle 22, such as in a front wheel drive vehicle. Alternative arrangements of gear boxes 72a and 72b or additional gear boxes may be employed with rear wheel drive and/or four wheel drive vehicles as required per vehicle construction and testing requirements.

Frame 24 of vehicle testing assembly 20 provides a low profile height of support surface 44 relative to the surface upon which testing assembly 20 is located, for example approximately 20 to 30 inches. Accordingly, a vehicle 22 may be driven onto testing assembly 20 by ramps, not shown. Alternatively, vehicle testing assembly 20 may be installed within a shallow pit such that ramps are not required to drive onto and off from testing assembly 20.

In operation of testing assembly 20, the rear cradle modules 30c, 30d are positioned based on the wheelbase of a vehicle 22 to be tested so that the roller pairs of the cradle modules 30 will receive and support the tires 32 of the vehicle 22. Initially the second roller 38 of each cradle module is moved into the closed position such that brake member 64 is compressed between first and second rollers 36, 38. Vehicle 22 is then driven onto testing assembly 20. Next, second rollers 38 are moved into the open test position by extension of cylinders 62.

Tires 32 of vehicle 20 are then accelerated up to the desired test speed. This may be accomplished by way of the drive systems 52 rotating the first rollers 36 to rotate the non-driving wheels of vehicle 22, or by the driven wheels of vehicle 20 being used to impart rotation to the first and second rollers 36, 38 of the cradle modules 30. In the case of a brake test, the vehicle 22 brakes may then be applied to monitor the braking forces over time in the manner generally described above.

Upon completion of a test, the second roller 38 of each cradle module 30 is moved back to the closed position such that brake member 64 is again compressed between the first and second rollers 36, 38. With second rollers 38 inhibited or prevented from rotating by way of brake member 64, vehicle 20 may then be driven out of cradle modules 30 and off from vehicle testing assembly 20, either by the same ramps used to drive onto the testing assembly 20, or by a second set of ramps at the other end of testing assembly 20.

It should be appreciated that numerous alternatives to testing assembly 20 may be employed within the scope of the present invention. For example, both first and second rollers could be moveable instead of one remaining fixed. Both first and second rollers could be powered, either by separate drive systems or by a single drive system, in which case a belt tensioner may be employed. A testing assembly may be provided with only two control modules to simultaneously test either the front or rear tire and wheel assemblies. Alternative arrangements of the first and second rollers may also be employed. For example, the uppermost circumferential surfaces may be positioned on a horizontal plane or sloped in the opposite direction relative to that shown. The powered roller of the pair of rollers may alternatively be positioned forward relative to the tire and wheel assembly, or may vary between the fore and aft cradle modules. Still further, the first and second rollers could be of similar diameter.

The roll/brake vehicle testing assembly of the present invention provides a versatile, compact and modular assembly for testing vehicle brake systems and drive train components. Cradle modules for receiving a tire of a vehicle tire and wheel assembly include a pair of rollers for supporting the tire, with the pair of rollers being moveable relative to each other to alter the circumferential supporting spacing of the tire on the pair of rollers. In the illustrated embodiment the pair of rollers comprise a non-powered roller that is moveable relative to a fixed drive roller, with a brake member being used to prevent rotation of the non-powered and powered rollers when the non-powered roller is moved into a closed position relative to the drive roller. The ability of the rollers to move relative to each other aids in the testing of vehicle models having different tire diameters and ground clearances, and the ability of the rollers to be positioned in the closed position whereby the non-powered roller is constrained from rotating enables test vehicles to be easily driven onto and off from the testing assembly. A frame of the testing assembly includes left and right sub-frames to which the cradle modules are mounted. The frame is of a low profile height and modular for enabling easy installation and removal. The compact and modular construction and ability to interconnect the cradle modules provides for a vehicle testing assembly that is readily transported, assembled and useable in developing markets.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A vehicle testing assembly for testing at least the brakes of an assembled vehicle, said testing assembly comprising:
   a pair of rollers, said pair of rollers adapted to support a tire of a tire and wheel assembly of a vehicle positioned on said testing assembly, said pair of rollers comprising a first roller and a second roller with said first and second rollers being moveable relative to one another to alter the spacing between said pair of rollers;
   a drive system connected to said first roller whereby said first roller comprises a drive roller for selectively imparting rotational motion to a tire of a vehicle tire and wheel assembly, with said second roller comprising a freewheeling roller to which rotational motion is imparted by a vehicle tire; and
   a brake member, said brake member being engageable with at least one of said first roller and said second roller to selectively inhibit rotation of engaged ones of said first and second rollers, wherein said first and second rollers are moveable toward one another into a closed position in which said first and second rollers are in substantial proximity for aiding the entry and exit of a vehicle to and from said testing assembly, and wherein said brake member engages said second roller when said first and second rollers are in said closed position.

2. The vehicle testing assembly of claim 1, wherein the position of said second roller is moveable relative to said first roller to alter the spacing between said pair of rollers with the spacing between said first and second rollers being adjusted without movement of said first roller.

3. The vehicle testing assembly of claim 1, further including a linear actuator operatively connected to at least one of said first and second rollers, and wherein said first and second rollers are selectively moved relative to one another by extension and retraction of said linear actuator.

4. The vehicle testing assembly of claim 1 wherein said drive system includes an electric motor, and wherein the rotational axis of said electric motor and the rotational axis of said first roller are approximately horizontally coplanar to substantially minimize the overall height of said vehicle testing assembly.

5. The vehicle testing assembly of claim 1 including a second pair of rollers, said second pair of rollers adapted to support the tire of the tire and wheel assembly of the opposite vehicle side relative to the other said pair of rollers, said second pair of rollers comprising a first roller and a second roller with said first and second rollers of said second pair of rollers being moveable relative to one another to alter the spacing between said second pair of rollers;
  a second drive system connected to said first roller of said second pair of rollers whereby said first roller of said second pair of rollers comprises a drive roller for selectively imparting rotational motion to a tire of a tire and wheel assembly, with said second roller of said second pair of rollers comprising a freewheeling roller to which rotational motion is imparted by a vehicle tire;
  a second brake member, said second brake member being engageable with at least one of said first roller and said second roller of said second pair of rollers to selectively inhibit rotation of engaged ones of said first and second rollers of said second pair of rollers.

6. The vehicle testing assembly of claim 1, wherein said brake member is substantially stationary and said second roller is moved into engagement with said brake member thereby engaging said brake member with said first roller to inhibit rotation of said first and second rollers when said first and second rollers are in said closed position.

7. The vehicle testing assembly of claim 6, wherein said brake member inhibits rotation of said first and second rollers via friction engagement with outer surfaces of said first and second rollers.

8. The vehicle testing assembly of claim 7, wherein said brake member comprises a compliant brake member positioned between said first and second rollers with said brake member being sandwiched into contact with said first and second rollers when said first and second rollers are in said closed position.

9. A vehicle testing assembly for testing at least the brakes of an assembled vehicle, said testing assembly comprising:
  a pair of cradle modules, one of said cradle modules adapted to support a tire of a tire and wheel assembly of a vehicle positioned on said testing assembly and the other said cradle module adapted to support the corresponding tire of the axially aligned tire and wheel assembly of the opposite side of the vehicle, each said cradle module comprising;
  a first roller and a second roller with said first and second rollers being moveable relative to one another to alter the spacing between said first and second rollers;
  a drive system connected to said first roller, said drive system selectively imparting rotational motion to the tire of a vehicle tire and wheel assembly whereby said first roller comprises a drive roller, with said second roller comprising a freewheeling roller; and
  said drive roller and said freewheeling roller being moveable toward one another into a closed position in which said drive and freewheeling rollers are in substantial proximity for aiding the entry and exit of a vehicle to and from said testing assembly.

10. The vehicle testing assembly of claim 9, wherein each said cradle module further includes a linear actuator operatively connected to said freewheeling roller, and wherein said freewheeling rollers are selectively moved relative to the respective drive rollers by the corresponding one of said linear actuators with the spacing being adjusted without movement of said drive roller.

11. The vehicle testing assembly of claim 9, wherein each said drive system of each said cradle module includes an electric motor, and wherein for each said cradle module the rotational axis of said electric motor and the rotational axis of said first roller are approximately horizontally coplanar to substantially minimize the overall height of said vehicle testing assembly.

12. The vehicle testing assembly of claim 9, further including an additional pair of cradle modules, one of said additional pair of cradle modules adapted to support a tire of another tire and wheel assembly of the vehicle positioned on said testing assembly and the other of said additional pair of cradle modules adapted to support the corresponding tire of the axially aligned tire and wheel assembly of the opposite side of the vehicle.

13. The vehicle testing assembly of claim 9, wherein each said cradle module further includes a brake member engageable with at least one of said freewheeling roller and said drive roller to selectively inhibit rotation of engaged ones of said freewheeling roller and said drive roller.

14. The vehicle testing assembly of claim 13, wherein said brake members engage said freewheeling rollers when said freewheeling rollers are moved into said closed positions.

15. The vehicle testing assembly of claim 14, wherein said brake members are positioned between said drive and freewheeling rollers of each said cradle module, with said brake members being sandwiched into contact with said drive and freewheeling rollers when said drive and freewheeling rollers are in said closed position whereby said brake members inhibit rotation of said freewheeling rollers and said drive rollers via friction engagement with outer surfaces of said freewheeling rollers and said drive rollers.

16. A vehicle testing assembly for testing at least the brakes of an assembled vehicle, said testing assembly comprising:
  a plurality of cradle modules, each said cradle module adapted to support a separate tire of a tire and wheel assembly of a vehicle positioned on said testing assembly, with each said cradle module comprising;
  a first roller and a second roller with said first and second rollers being laterally moveable relative to one another to alter the spacing between said first and second rollers;
  a linear actuator operatively connected to at least one of said first and second rollers with said first and second rollers being selectively moved relative to one another by extension and retraction of said linear actuator;

a drive system connected to said first roller, said drive system selectively imparting rotational motion to the tire of a vehicle tire and wheel assembly whereby said first roller comprises a drive roller, said drive system including an electric motor, and wherein the rotational axis of said electric motor and the rotational axis of said drive roller are approximately horizontally coplanar to substantially minimize the overall height of said vehicle testing assembly, wherein said second roller of each said cradle module comprises a freewheeling roller with said linear actuator being operatively connected to said freewheeling roller, and wherein said freewheeling roller is moveably adjustable relative to said drive roller to alter the spacing between said freewheeling roller and said drive roller with the spacing being adjusted without movement of said drive roller, and wherein said freewheeling rollers of each said cradle module are moveable toward the respective said drive rollers into a closed position in which said drive and freewheeling rollers are in substantial proximity for aiding entry and exit of a vehicle to and from said testing assembly, and wherein each said cradle module includes a brake member engageable with said freewheeling roller to selectively inhibit rotation of said freewheeling roller when in said closed position.

17. The vehicle testing assembly of claim 16, wherein said cradle modules are joined together by frame members.

* * * * *